United States Patent
Rese et al.

(10) Patent No.: US 9,135,428 B2
(45) Date of Patent: Sep. 15, 2015

(54) CROSS SYSTEM SECURE LOGON

(71) Applicant: INTERNATIONAL BUSINESS MACHINES CORPORATION, Armonk, NY (US)

(72) Inventors: Joachim Rese, Boeblingen (DE); Jochen Roehrig, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 35 days.

(21) Appl. No.: 13/658,386

(22) Filed: Oct. 23, 2012

(65) Prior Publication Data

US 2013/0145170 A1   Jun. 6, 2013

(30) Foreign Application Priority Data

Dec. 1, 2011  (EP) .................................... 11191513

(51) Int. Cl.
   *G06F 21/00*  (2013.01)
   *G06F 21/40*  (2013.01)
   *G06F 21/41*  (2013.01)

(52) U.S. Cl.
   CPC ................ *G06F 21/40* (2013.01); *G06F 21/41* (2013.01)

(58) Field of Classification Search
   CPC ......... G06F 21/41; G06F 21/30; G06F 21/00; G06F 21/40; H04L 9/3236; H04L 9/3242; H04L 9/0643; G04L 9/3226
   See application file for complete search history.

(56) References Cited

U.S. PATENT DOCUMENTS 5,140,321 A  *  8/1992  Jung ............................... 341/55
6,108,783 A  *  8/2000  Krawczyk et al. ............ 713/180

(Continued)

FOREIGN PATENT DOCUMENTS

JP       2007232754 A     9/2007
WO    WO2011046939 A1    4/2011

OTHER PUBLICATIONS

Narayanan, Arvind et al., "Fast Dictionary Attacks on Passwords Using Time-Space Tradeoff, Proceedings CCS '05 Proceedings of the 12th ACM Conference on Computer and Communications Security," Nov. 2005, 9 pages.

(Continued)

*Primary Examiner* — Taghi Arani
*Assistant Examiner* — Sharon Lynch
(74) *Attorney, Agent, or Firm* — William A. Kinnaman, Jr., Esq.; Blanche E. Schiller, Esq.; Heslin Rothenberg Farley & Mesiti P.C.

(57) ABSTRACT

A cross system secure logon in a target system by using a first authentication system and a second authentication system. A correct password may be valid on the first authentication system and the second authentication system. An aspect includes receiving an input password, generating a first hash key by using the first authentication system, and/or generating a second hash key by using the second authentication system, wherein each authentication system uses a system unique non-collision free hash algorithm. Further, in one aspect, comparing the first hash key with a first predefined hash key of the correct password stored in the first authentication system, and/or comparing the second hash key with a second predefined hash key of the correct password stored in the second authentication system. Furthermore, granting access to the target system based on at least one of the comparisons.

15 Claims, 6 Drawing Sheets

(56) References Cited

U.S. PATENT DOCUMENTS

| | | | |
|---|---|---|---|
| 6,170,058 B1* | 1/2001 | Kausik | 713/193 |
| 6,263,446 B1* | 7/2001 | Kausik et al. | 726/5 |
| 6,275,919 B1* | 8/2001 | Johnson | 711/216 |
| 6,654,889 B1* | 11/2003 | Trimberger | 713/191 |
| 7,051,209 B1* | 5/2006 | Brickell | 713/183 |
| 7,321,972 B2* | 1/2008 | Isaacson et al. | 713/189 |
| 7,941,836 B2 | 5/2011 | Pinkas et al. | |
| 8,438,393 B2* | 5/2013 | Zhang | 713/171 |
| 8,649,509 B2* | 2/2014 | Asher | 380/28 |
| 2001/0008012 A1* | 7/2001 | Kausik | 713/156 |
| 2001/0034837 A1* | 10/2001 | Kausik et al. | 713/185 |
| 2002/0087890 A1 | 7/2002 | Chan et al. | |
| 2002/0161721 A1* | 10/2002 | Yuan et al. | 705/65 |
| 2005/0005145 A1* | 1/2005 | Teixeira | 713/193 |
| 2005/0144484 A1 | 6/2005 | Wakayama | |
| 2007/0113083 A1* | 5/2007 | Volkovs et al. | 713/168 |
| 2007/0143597 A1* | 6/2007 | Feil | 713/159 |
| 2008/0120504 A1 | 5/2008 | Kirkup et al. | |
| 2008/0141344 A1* | 6/2008 | Alper et al. | 726/3 |
| 2010/0037053 A1* | 2/2010 | Stenberg | 713/169 |
| 2010/0070766 A1* | 3/2010 | Lu | 713/168 |
| 2010/0273450 A1* | 10/2010 | Papineau et al. | 455/411 |
| 2011/0087888 A1* | 4/2011 | Rennie | 713/182 |
| 2012/0030743 A1* | 2/2012 | Semba | 726/7 |
| 2013/0275764 A1* | 10/2013 | Feil | 713/182 |

OTHER PUBLICATIONS

Wright, Joshua et al., "An Assessment of the Oracle Password Hashing Algorithm," Oct. 2005, pp. 1-11.

Hoover, D.N. et al., "Software Smart Cards via Cryptographic Camouflage," Proceedings of the 1999 IEEE Symposium on Security and Privacy, May 1999, pp. 1-8.

Keith, Mark et al., "The Usability of Passphrases for Authentication: Am Empirical Field Study," International Journal of Human-Computer Studies, vol. 65, Issue 1, Jan. 2007, pp. 17-28—Abstract Only.

International Search Report and Written Opinion for PCT/IB2012/055589 dated Feb. 26, 2013, pp. 1-4.

Response to International Search Report and Written Opinion for PCT/IB2012/055589 dated Apr. 23, 2013, pp. 1-7.

* cited by examiner

CROSS SYSTEM SECURE LOGON

PRIOR FOREIGN APPLICATION

This application claims priority from European patent application number 11191513.8, filed Dec. 1, 2011, which is hereby incorporated herein by reference in its entirety.

BACKGROUND

An aspect of the invention relates generally to a method for a cross system secure logon in a target system and to a secure logon system.

An aspect of the invention relates further to an operating system, a computer system, a data processing program, and a computer program product.

Many systems require a logon or login procedure before granting access to the system or applications running on the system. One example of a common logon procedure may require a user input, i.e. a password, which may be transferred by a hash function into a hash key. The hash key may then be compared with the hash key of the correct password, which might have been stored by the system or application. If the generated hash key matches the stored hash key, the user may be logged on, i.e. access may be granted. Otherwise the logon fails and the access may be rejected.

US 2002/0087890 A1, incorporated herein by reference in its entirety, discloses a method including receiving input data. The method also includes determining if a salt value exists, and generating a salt value and storing the salt value in a table entry if the salt value does not exist. The method further provides for retrieving the salt value from the table entry if the salt value exists and generating a hash from the salt value and the input data. The method also provides for generating a password from the hash and returning the password to an application to gain entry to the application.

US 2008/0120504 A1, incorporated herein by reference in its entirety, discloses a system and method for authenticating a client device by an authentication device. The client device user is assigned a personal identification number (PIN) generated by the authentication device. The user provides the PIN and a password to the client device from which the client device generates a symmetric key and further generates a public/private key pair. The private key is encrypted using the symmetric key and stored in encrypted form only. The public key and a message authentication code, generated from the PIN are provided to the authentication device, which stores the public key. Subsequently, when the user seeks to be authenticated, the user enters a password at the client device, which is used to generate a symmetric key to decrypt the encrypted private key. A message to the authentication device is signed using the resultant value. The authentication device uses the public key to verify the signature of the message.

Standard logon procedures are considered confident because the used hash functions may be irreversible in the sense that neither a formula nor an algorithm exists to calculate the argument of the hash function (password) from the hash key. However, an attacker can use exhaustive search techniques to find the correct password. Thus, either he probes possible passwords against the logon procedure or—if the attacker knows the hash key—he applies the hash function to possible passwords and compares the result with the hash key. The amount of valid passwords is huge and it might be usually impossible to probe all sequences of characters that form a valid password. However, in reality most users assign a password that has some special characteristics like limited in length, a real language word or a slight modification of it. Based on this observation, an attacker can build a dictionary containing some million words that are likely to be used as a password and probe only those words. One further issue is that many users use the same password for multiple systems and applications. That means that, if an attacker knows the plain text password, he may try to use the password to logon to a system or an application other than that he has hacked, and very likely he may be successful. Thus, the weakest system may govern the safety of many systems.

Thus, there may be a need for an improved method for a secure logon in a target system.

BRIEF SUMMARY

This need may be addressed by a method for a secure logon in a target system, a secure logon system, a computer system, an operating system, a data processing program, and a computer program product according to the independent claims.

In one embodiment, a method for a secure logon in a target system by using a first authentication system and a second authentication system is provided. A correct password may be valid on the first authentication system and the second authentication system. The method may comprise receiving an input password. The method may further comprise generating a first hash key by using the first authentication system, and/or generating a second hash key by using the second authentication system, wherein each authentication system uses a system unique non-collision free hash algorithm. In addition, the method may comprise comparing the first hash key with a first predefined hash key of the correct password stored in the first authentication system and/or comparing the second hash key with a second predefined hash key of the correct password stored in the second authentication system. Furthermore, the method may comprise granting access to the target system based on at least one of the comparisons.

In another embodiment, a secure logon system for a secure logon in a target system by using a first authentication system and a second authentication system is provided. A password may be valid on the first authentication system and the second authentication system. The secure logon system may comprise a receiving unit being adapted to receive an input password. Further, the secure logon system may comprise a generation unit being adapted to generate a first hash key by using the first authentication system and/or being adapted to generate a second hash key by using the second authentication system, wherein each authentication system uses a system unique non-collision free hash algorithm. In addition, the secure logon system may comprise a comparison unit being adapted to compare the first hash key with a first predefined hash key of the password stored in the first authentication system, and/or being adapted to compare the second hash key with a second predefined hash key of the password stored in the second authentication system. Further, the secure logon system may comprise a control unit being adapted to grant access to the target system based on at least one of the comparisons.

In particular, granting access to the target system based on at least one of the comparisons may denote granting access to the target system based on one or both of the comparisons.

The aspects defined above and further aspects of the present invention are apparent from the examples of embodiments to be described hereinafter and are explained with reference to the examples of embodiments, but to which the invention is not limited.

BRIEF DESCRIPTION OF THE SEVERAL VIEWS OF THE DRAWINGS

Embodiments of the invention will now be described, by way of example only and with reference to the following drawings.

DETAILED DESCRIPTION

In the context of this application, the following conventions have been followed:

Authentication system—Authentication system may be any kind of system being adapted to receive input information, for example a password, and being able to authenticate a user based on this input information.

Target system—The target system may be the system to which the user wants access.

Secure logon—A secure logon may be a login or logon being secured by using an authentication system.

Password—A password may be symbols, for instance letters or numbers. The password should be able to identify one user.

System unique non-collision free hash function—A hash function is any algorithm or subroutine that maps large data sets, in this case passwords, to smaller data sets, called hash keys. The values returned by a hash function are called hash values, hash codes, hash sums, checksums or simply hashes. "System unique" may denote that the hash function, used for an authentication system, is globally unique. "Non-collision free" may denote that at least one collision may occur as more than one password may be mapped to one single hash key (in contrast to collision-free, wherein one password is mapped to one hash key). One specific embodiment of a "non-collision free" hash function may be a "collision-reliable" hash function, where a certain number of passwords may be mapped to a single system unique hash key. In particular, a hash function or hash algorithm may map a given number M of arguments (passwords) to the same hash key.

Hash key—A hash key may be the output of the hash function and may be related to a plurality of passwords.

In the following, a detailed description of the figures will be provided. All illustrations in the figures are schematic. Firstly, a block diagram of an embodiment of the method for a secure logon will be described. Afterwards, embodiments of the method and the secure logon system will be described.

Figure 1:
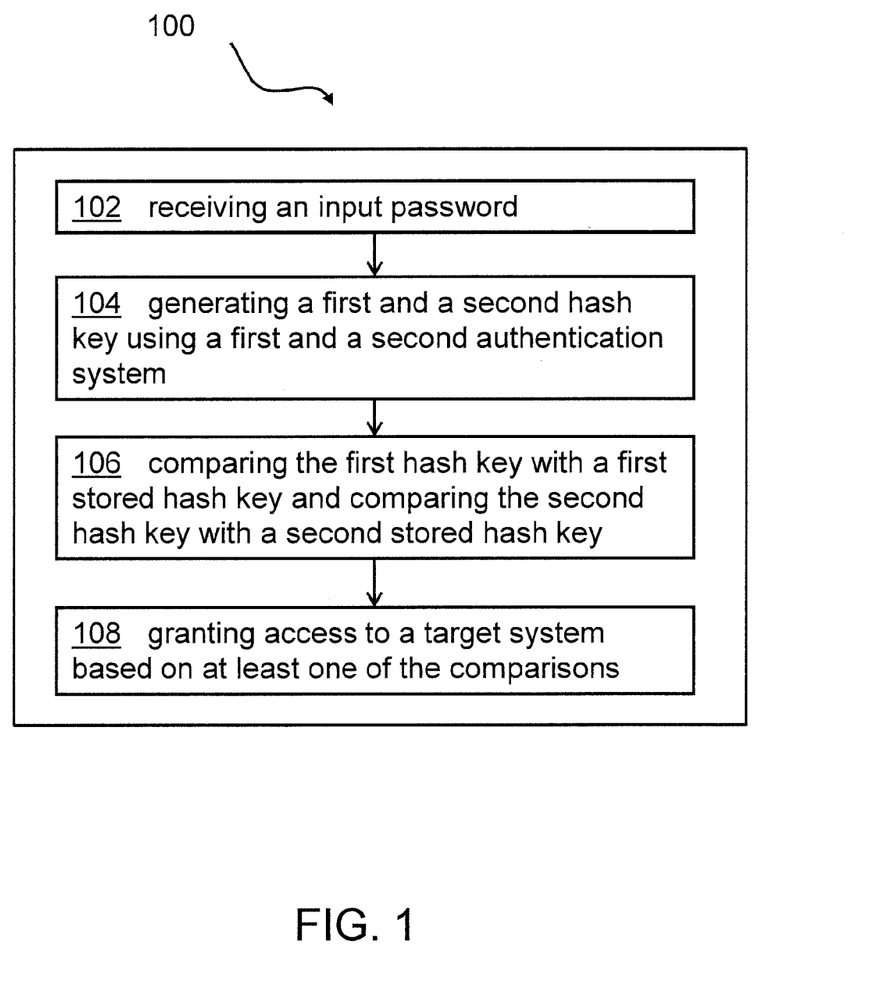
FIG. 1 shows a block diagram of an embodiment of the inventive method for a secure logon in a target system.

FIG. 1 shows a block diagram of an embodiment of the inventive method 100 for a secure logon in (or to) a target system by using a first authentication system and a second authentication system. A correct password may be valid on the first authentication system and the second authentication system. The method may comprise receiving an input password, 102. The method may further comprise generating, 104, a first hash key by using the first authentication system, and/or generating, 104, a second hash key by using the second authentication system, wherein each authentication system uses a system unique non-collision free hash algorithm. In addition, the method may comprise comparing, 106, the first hash key with a first predefined hash key of the correct password stored in the first authentication system, and/or comparing, 106, the second hash key with a second predefined hash key of the correct password stored in the second authentication system. Furthermore, the method may comprise granting access, 108, to the target system based on at least one of the comparisons.

Figure 2:
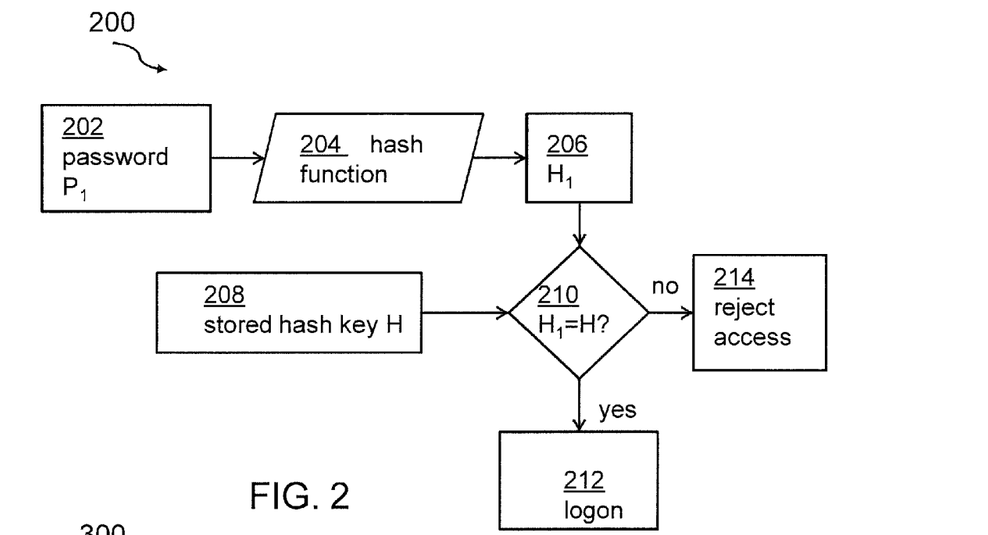
FIG. 2 shows a block diagram of a common logon procedure.

FIG. 2 shows a block diagram 200 of a common logon procedure. This common logon procedure may be used at virtually all systems and applications. A user given input $P_1$ 202 may be transferred by a hash function 204 into a hash key $H_1$ 206. The hash key $H_1$ may be compared, 210, with a hash key H 208 of the correct password, which has been stored by the system or application. If $H_1$ matches H, the user may be logged on, 212. Otherwise, the logon fails and access to a target system may be rejected or denied, 214.

The standard logon procedure may be considered confident because the used hash functions can be irreversible in the sense that neither a formula nor an algorithm exists to calculate the argument of the hash function (password) from the hash key. However, an attacker can use exhaustive search techniques to find the correct password. Thus, either he probes possible passwords against the logon procedure or—if the attacker knows the hash key—he applies the hash function to possible passwords and compares the result with the hash key. The amount of valid passwords may be huge and it might usually be impossible to probe all sequences of characters that form a valid password. However, in reality, most users assign a password that has some special characteristics like limited in length, a real language word, or a slight modification of it. Based on this observation, an attacker can build a dictionary containing words that are likely to be used as a password and the attacker may probe or try only those words.

Many users use the same password for multiple systems and applications. That may mean that, if an attacker knows the plain text password, he may try to use the password to logon to a system or an application other than that he has hacked, and might be successful.

This scenario may be avoided by the method as described in FIG. 1, minimizing the risk of passwords that have been stolen from one system or application being used for unauthorized logon to another system or application.

The weak point of the described common system or procedure may be the fact that the used hash function is quasi injective. Only very few (one in virtually all cases) passwords are mapped to the same hash key. For instance, the password $P_1$ of FIG. 2 is mapped to hash key $H_1$, where any password $P_n$, not equal to $P_1$, is mapped to a hash key $H_n$ that is not equal to $H_1$. Hence, a hash key may basically represent exactly one password, and therefore the password might be derived from the hash key.

According to an aspect of the described inventive method, a hash function may be used that maps a given number M of arguments (passwords) to the same hash key. This characteristic may be called "collision-reliable" or "non-collision free". For instance, a collision-reliable hash function may map a password $P_1$ to a hash key $HA_1$. Furthermore M−1 words $P_2, \ldots, P_M$ may exist that are mapped to the same hash key $HA_1$ when used as argument to the collision-reliable hash function.

The number M of arguments of a collision-reliable hash function that map to the same hash key may be considered as exact, at least or on average. The number M may be high compared to the maximum number of wrong passwords that usually can be entered before the user is locked. M may be very low relative to the number of all possible passwords (for instance, one million might be a value for M).

Another characteristic of the hash function, implemented by an embodiment of the present invention, may be uniqueness per system or application. In other words, two different systems or applications might not implement the same hash function. For instance, the unique, collision-reliable hash function implemented by System B may map the word $P_1$ to $HB_1$, which in general may be different to $HA_1$, the hash key that System A maps $P_1$ to. Uniqueness may be used to ensure that all other passwords $P_2, \ldots, P_M$ that System A maps to $HA_1$ are not (or most likely not) mapped to $HB_1$.

Figure 3:
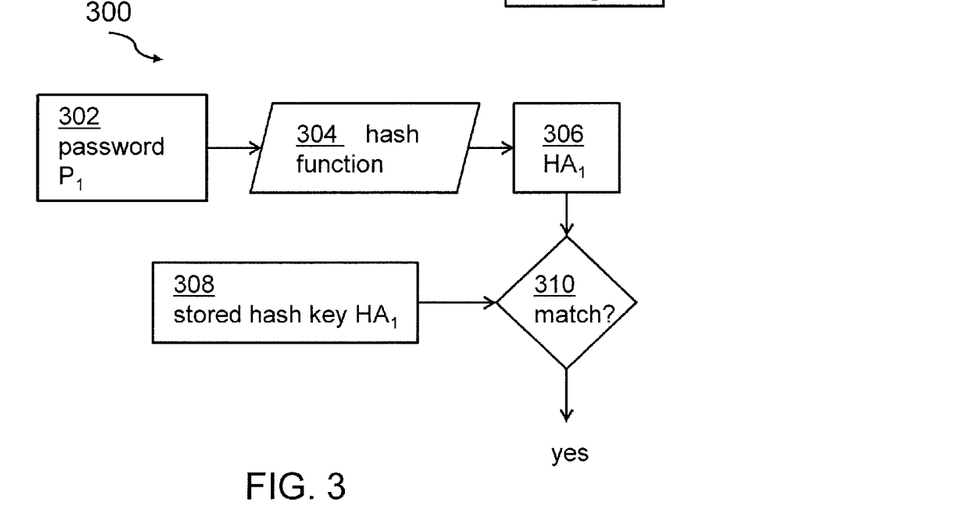
FIG. 3 shows a block diagram of a logon procedure according to an embodiment of the inventive method for logon on a first authentication system.
Figure 4:
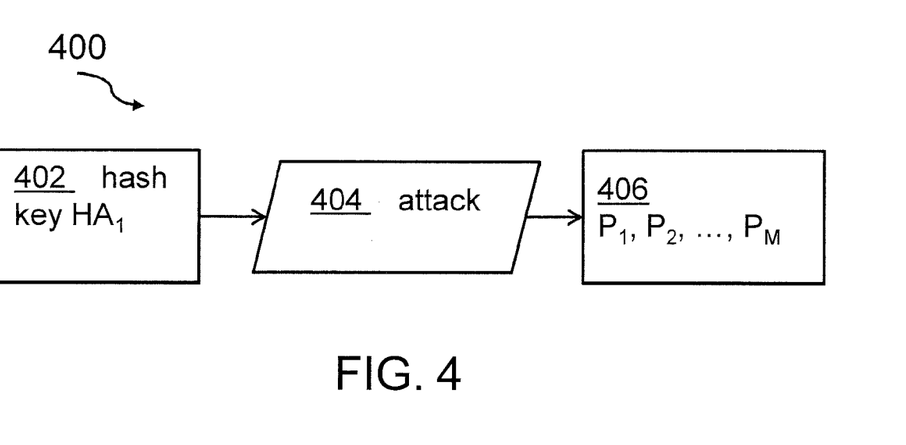
FIG. 4 shows a block diagram of a possible attack to the first authentication system of FIG. 3.
Figure 5:
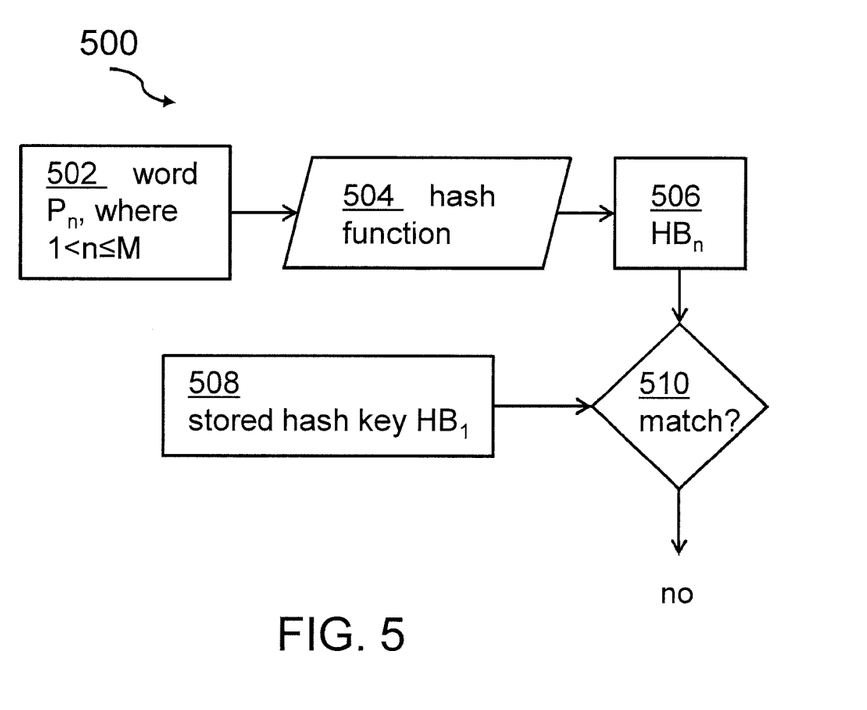
FIG. 5 shows a block diagram of a logon procedure according to an embodiment of the inventive method for logon on a second authentication system by the attacker of FIG. 4.

FIG. 3 shows a block diagram 300 of a logon procedure according to an embodiment of the inventive method for logon on a first authentication system. FIG. 4 shows a block diagram 400 of a possible attack to the first authentication system of FIG. 3. FIG. 5 shows a block diagram 500 of a logon procedure according to an embodiment of an aspect of the inventive method for logon on a second authentication system by the attacker of FIG. 4.

FIGS. 3 to 5 show why a password, stolen from System A, very likely cannot be used to logon to System B. It may be assumed that a user has assigned the same password $P_1$ for access to both systems. The correct password $P_1$ 302 may be mapped by a unique, collision-reliable hash function 304 at system A to a hash key $HA_1$ 306. The hash key may be compared, 310, with a stored hash key, 308. The stored hash key may be generated before the logon procedure and may be stored for further use in the authentication procedure. Since there is a match, system access may be allowed.

An attacker that has either access to the hash key $HA_1$ 402 or can perform the logon procedure virtually unlimited times or exploit brute-force techniques like exhaustive search, rainbow-tables, dictionary based search or others, 404, can find all words $P_1, \ldots, P_M$ 406 that are mapped to the hash key $HA_1$. From an attackers observation, usually all words may be even likely to be the correct password.

On System B, the password $P_1$ may be mapped by the implemented unique, collision-reliable hash function 504 to hash key $HB_1$, which matches the stored hash key 508 and therefore may allow system access. However, any other possible password $P_2, \ldots, P_M$ 502 that an attacker found by breaking into System A might not be mapped by System B to $HB_1$ 510, and therefore none of those words may allow access to system B. There may be, however, M different words $PB_1=P_1, PB_2, \ldots, PB_M$ that may allow access to System B. Since M usually may be much higher than the number of failing logon attempts before a user is locked, the set of possible passwords $P_1, \ldots, P_M$ may be almost worthless for the attacker for breaking into System B.

Exploitation of collision-reliable hash functions may increase cross system protection from brute-force attacks, since a hash key or password stolen from one system may be virtually not usable for a second system. However, a single system may become less secured because for each user M different words qualify as correct password for system access. Thus, an attacker might need M times less probes or attempts to get a valid password for a single system. This trade-off or compromise between single system protection and cross-system protection might be acceptable, since successful brute-force attacks may usually require special authorization (that the attacker got legally or illegally), for example, manipulation of audit functionality, unlocking of users, access to hash keys, or direct access to encryption facility.

Figure 6:
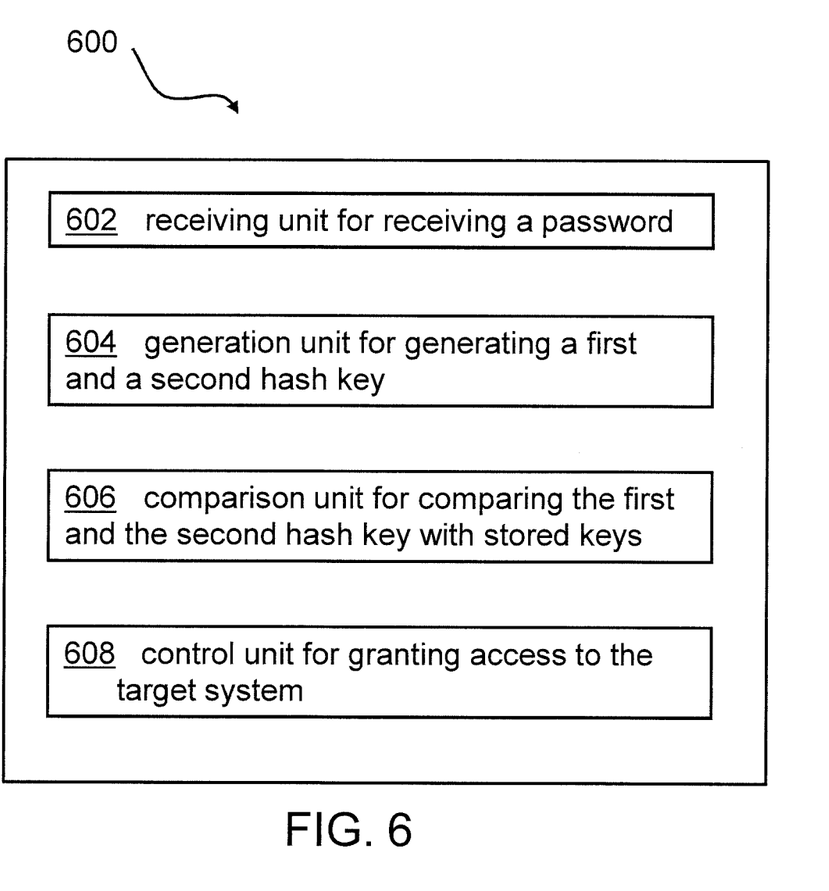
FIG. 6 shows a block diagram of a secure logon system.

For some systems or applications, the loss of security by introducing collision-reliable hash functions might not be acceptable. One embodiment of the present invention may compensate the reduced security of a single system by introducing a cascading logon procedure. FIG. 6 shows a block diagram 600 of such a secure logon system.

The secure logon system 600 may be used for a secure logon in a target system by using a first authentication system and a second authentication system. A password may be valid on the first authentication system and the second authentication system. The secure logon system may comprise a receiving unit 602 being adapted to receive an input password. The secure logon system may further comprise a generation unit 604 being adapted to generate a first hash key by using the first authentication system, and/or being adapted to generate a second hash key by using the second authentication system. Each authentication system may use a system unique non-collision free hash algorithm, as described above.

The secure logon system may further comprise a comparison unit 606 being adapted to compare the first hash key with a first predefined hash key of the password stored in the first authentication system, and/or being adapted to compare the second hash key with a second predefined hash key of the password stored in the second authentication system. The result of the comparison may be a boolean value, i.e. true or false. The secure logon system may further comprise a control unit 608 being adapted to grant access to the target system based on at least one of the comparisons. This may mean that, if the result of the comparison is true or positive, the access may be granted, and if the result of the comparison is false or negative, the access may be rejected. The access may be granted either to a first target system via the first authentication system or a second target system via the second authentication system.

Figure 7:
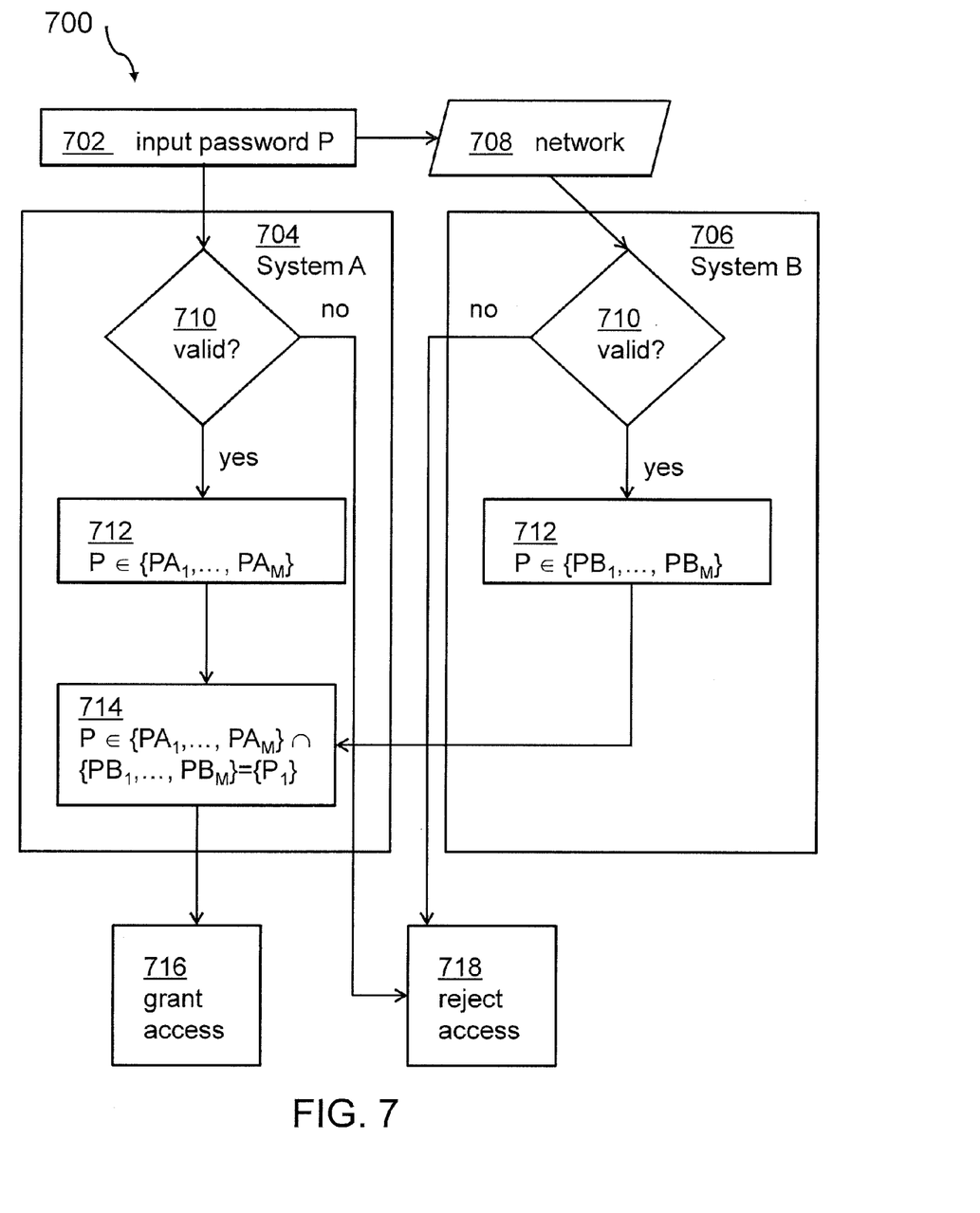
FIG. 7 shows a block diagram of an implementation of the secure logon system of FIG. 6.

FIG. 7 shows a block diagram 700 of an implementation of the secure logon system of FIG. 6. Two systems, System A, 704, and System B, 706, are shown. For every regular user, on each system there may be the same password stored as hash key of a unique, collision-reliable hash function.

In the following, the correct password may be $P_1$. Since collision-reliable hash functions are used, $P_1$ cannot be derived from a single hash key stored on one of the two systems. The user may enter, for instance via an input terminal, a word P 702 as password at System A. In addition, the user input P is sent to System B. The password may be forwarded either directly via the input terminal or via System A to System B. This may be done via a network 708 which may comprise a secure channel, i.e. over a secure network and/or a secure network protocol. The unique, collision-reliable hash function 710 may be performed on P in both systems. If the result does not match the hash key stored on System A, system access is rejected 718. Otherwise P is element of the set of words $\{PA_1, \ldots, PA_M\}$ that are mapped to the hash key stored at System A, 712. This set includes $P_1$. On System B, the generated hash key is also compared with the hash key stored on System B. If it does not match, system access to System A is rejected, 718. Otherwise P is element of the set of words $\{PB_1, \ldots, PB_M\}$ that are mapped to the hash key stored at System B, 712. This set includes $P_1$. The information whether P has passed the logon procedure on System B may be sent back to System A. Thus, System A can determine whether P is element of the intersection of $\{PA_1, \ldots, PA_M\}$ and $\{PB_1, \ldots, PB_M\}$, 714. If this holds true, system access may be granted 716. Since System A and System B implement different hash functions, the intersection $\{PA_1, \ldots, PA_M\} \cap \{PB_1, \ldots, PB_M\}$ may contain most likely only $P_1$. Thus, only the correct password $P_1$ may allow system access.

With collision-reliable hash functions, a plain password cannot be determined from the hash key stored on a system and potentially stolen. Only the information that the plain password is one out of a set of M words may be available. If all M words are equally likely the plain password, the protection of the plain password may be sufficient. However, in reality some of the M words might be much more likely the plain password than others. In particular, if the plain password is weak, i.e. a real language word, a slight modification of such, a trivial number etc., it might easily be found within the set of M words. Furthermore, a dictionary based brute-force attack will find the weak password much more likely than any other of the M−1 words that are mapped to the same hash key. Thus, in a further embodiment, a collision-reliable hash function may be used that maps only weak passwords to the same hash key. A dictionary that contains real language words, modifications of such, numbers, etc., may be used to classify a password as weak. The dictionary should be appropriate in size, for example some 100 millions entries. It does not necessarily need to be stored completely. Instead, for each stored real language word a set of modifications can be calculated. The hash functions may map each M dictionary words to the same hash key. M should be small compared to the dictionary size, but still high compared to the usual number of allowed unsuccessful logon attempts before a user gets locked. Otherwise, the number of different hash keys for all dictionary words may be low and an attacker might be able to simply guess a word that allows system access.

The described secure logon system may also be comprised in a computer system. This way, the secure logon system of the computer system may work in cooperation with an operating system for performing the method for a secure logon, as described above.

Figure 8:
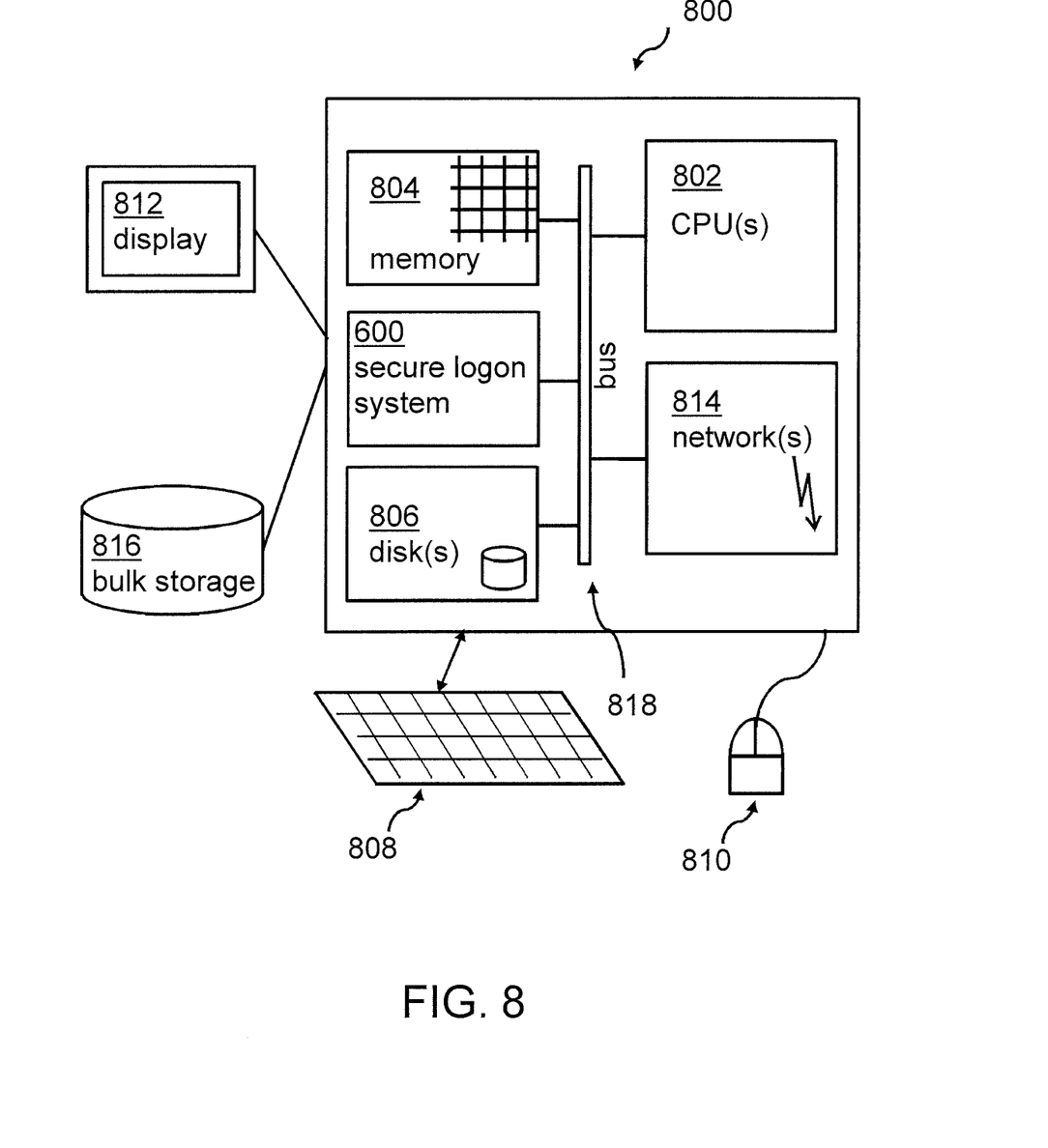
FIG. 8 displays a computer system including the inventive secure logon system.

Embodiments of the invention may be implemented on virtually any type of computer, regardless of the platform being suitable for storing and/or executing program code. For example, as shown in FIG. 8, a computer system 800 may include one or more processor(s) 802 with one or more cores per processor, associated memory elements 804, an internal storage device 806 (e.g., a hard disk, an optical drive such as a compact disk drive or digital video disk (DVD) drive, a flash memory stick, etc.), and numerous other elements and functionalities, typical of today's computers (not shown). The memory elements 804 may include a main memory, e.g., a random access memory (RAM), employed during actual execution of the program code, and a cache memory, which provides temporary storage of at least some program code and/or data in order to reduce the number of times, code and/or data must be retrieved from a long term storage medium or external bulk storage 816 for an execution. Elements inside the computer 800 may be linked together by means of a bus system 818 with corresponding adapters. Additionally, the secure logon system 600 may be attached to the bus system 818.

The computer system 800 may also include input means, such as a keyboard 808, a pointing device such as a mouse 810, or a microphone (not shown). Furthermore, the computer 800, may include output means, such as a monitor or screen 812 [e.g., a liquid crystal display (LCD), a plasma display, a light emitting diode display (LED), or cathode ray tube (CRT) monitor]. The computer system 800 may be connected to a network (e.g., a local area network (LAN), a wide area network (WAN), such as the Internet or any other similar type of network, including wireless networks via a network interface connection 814. This may allow a coupling to other computer systems or a storage network or a tape drive. Those, skilled in the art will appreciate that many different types of computer systems exist, and the aforementioned input and output means may take other forms. Generally speaking, the computer system 800 may include at least the minimal processing, input and/or output means, necessary to practice embodiments of the invention.

Further, those skilled in the art will appreciate that one or more elements of the aforementioned computer system 800 may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources or a smartphone.

Further, software instructions to perform embodiments of the invention may be stored on a computer readable medium, such as a compact disk (CD), a diskette, a tape, or any other computer readable storage device.

The above-described method for a secure logon in (or to) a target system may offer a couple of advantages.

In particular, it may minimize the risk of passwords that have been stolen from one system or application being used for unauthorized logon to another system or application. The weak point of current implementations of the logon procedure might be the fact that the used hash function is quasi injective. Only very few—i.e. one in virtually all cases—passwords may be mapped to the same hash key. Hence, a hash key may represent exactly one password and therefore the password can be derived from the hash key.

The two authentication systems have each a unique hash algorithm and might not implement the same hash function. By using a non-collision free hash algorithm, one password for the first authentication system may be derived from the first generated hash key by an attacker. However, the attacker might not have derived the correct password for the second authentication system. For example, the unique, collision-reliable hash function, implemented by the second authentication system, may map the word $P_1$ to the hash key $HB_1$, which in general may be different to $HA_1$, the hash key that the first authentication system maps $P_1$ to. Uniqueness might be important to ensure that all other passwords $P_2, \ldots, P_M$ that the first system may map to $HA_1$ are not mapped to $HB_1$. Thus, an attacker, which may have gathered one of the passwords $P_2, \ldots, P_M$ cannot get access via the second authentication system, as this system would reject the access, as the comparison of a stored hash key of the second hash algorithm would not lead to a match with a generated hash key based on one of the passwords $P_2, \ldots, P_M$.

In one embodiment of the method, granting access to the target system comprises granting access based on both comparisons.

According to this embodiment, a cascading logon procedure may be realized. Access to the target system may be granted only in the case that both comparisons are valid. Thus, an attacker, which may have gathered one of the passwords $P_2, \ldots, P_M$ cannot get access to the target system as the second authentication system would reject the access as the comparison of a stored hash key of the second hash algorithm would not lead to a match with a generated hash key based on one of the passwords $P_2, \ldots, P_M$.

In a further embodiment of the method, granting access to the target system comprises granting access to a first target system based on a comparison of the first hash key with the first predefined hash key and granting access to a second target system based on a comparison of the second hash key with the second predefined hash key.

According to this embodiment, an attacker, which may have gathered one of the passwords $P_2, \ldots, P_M$ might get access to the first target system. However, he cannot get access to the second target system via the second authentication system as this system would reject the access as the comparison of a stored hash key of the second hash algorithm would not lead to a match with a generated hash key based on one of the passwords $P_2, \ldots, P_M$.

In one embodiment of the method, each system unique non-collision free hash algorithm may be a collision-reliable hash algorithm. As described above, the collision-reliable hash algorithm may create for a certain number of passwords a single system unique hash key.

In a further embodiment of the method, the method further comprises creating the first predefined hash key by using the unique non-collision free hash algorithm of the first authentication system, and creating the second predefined hash key by using the unique non-collision free hash algorithm of the second authentication system, and storing the first predefined hash key in the first authentication system, and storing the second predefined hash key in the second authentication system.

According to this embodiment, the first predefined hash key and the second predefined hash key may be generated before starting the authentication systems for providing a secure logon.

In another embodiment of the method, the method comprises receiving the input password via a secure channel.

A secure channel may be a channel being adapted to transfer data resistant to interception and tampering. The secure channel may be used for receiving the password, and may further be used between the first and the second authentication system.

In a further embodiment of the method, comparing the first hash key with a first predefined hash key, and comparing the second hash key with a second predefined hash key, comprises generating a boolean information for each comparison.

Each comparison may lead to a decision whether the compared values or keys are equal or not. The result may be stored and further processed as boolean information, for example as true or false. These values, i.e. true and false, may also be in the format of 0 and 1.

In an embodiment of the secure logon system, the target system and the first authentication system are part of one single system.

The target system may be the system to which the user wants access. The target system and the first authentication system may be integrated in one single system. The secure logon system may provide the input password to the first authentication system and the second authentication system. The second authentication system may be located remote from the target system and the first authentication system and may be adapted to communicate via a secure channel.

In a further embodiment of the secure logon system, the secure logon system comprises the target system, the first authentication system, and the second authentication system.

The target system may be implemented as one single system together with the two authentication systems. The secure logon system may provide communication for authenticating a user in a first step only to the part of the overall system representing both authentication systems. In case of a positive authentication, the secure logon system may provide access to the part of the overall system representing the target system or application.

Furthermore, an operating system may be configured to execute the method according to an aspect of the inventive method, as explained above. Such integration into an operating system may have the advantage that the method for a secure logon may be performed immediately as a new function of the operating system, just after an installation. No new additional operating system programs may need to be installed on the computer for a secure logon.

It should be noted that embodiments may take the form of an entire hardware implementation, an entire software embodiment or an embodiment containing both, hardware and software elements. In one embodiment, an aspect of the invention may be implemented in software, which includes, but is not limited to, firmware, resident software and/or microcode.

In another embodiment, a set of data processing programs for execution in networked data processing systems (being related to the first and the second authentication system) may be provided comprising software code portions for performing the method, as described above, when the program may be run on the networked data processing systems. The data processing systems may be computer or computer systems.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device, or a network of computers (for instance the first and the second authentication system).

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

While the invention has been described with respect to a limited number of embodiments, those skilled in the art, having benefit of this disclosure, will appreciate that other embodiments can be devised, which do not depart from the scope of the invention as disclosed herein. Accordingly, the scope of the invention should be limited only by the attached claims.

It should also be noted that the term "comprising" does not exclude other elements or steps and "a" or "an" does not exclude a plurality. On the other side, the term "comprising" may also include the case of "consisting of". Also, elements described in association with different embodiments may be combined. It should also be noted that reference signs in the claims should not be construed as limiting elements.

What is claimed is:

1. A method for a cross system secure logon in a target system by using a first authentication system and a second authentication system, wherein a correct password is valid on the first authentication system and the second authentication system, the method comprising:
   receiving an input password at the first authentication system and at the second authentication system;
   based on the receiving, generating a first hash key based on the input password by using the first authentication system and concurrently generating a second hash key independent from the generating of the first hash key, based on the input password by using the second authentication system, wherein the first authentication system uses a first non-collision free hash algorithm unique to the first authentication system to generate the first hash key and the second authentication system uses a second non-collision free hash algorithm unique to the second authentication system to generate the second hash key; wherein the first non-collision free hash algorithm is distinct from the second non-collision free algorithm;
   creating a first predefined hash key by using the first non-collision free hash algorithm, and creating a second predefined hash key by using the second non-collision free hash algorithm;
   comparing in the first authentication system the first hash key with the first predefined hash key of the correct password stored in the first authentication system to determine whether the first hash key and first predefined hash key match and concurrently comparing in the second authentication system the second hash key with the second predefined hash key of the correct password stored in the second authentication system to determine whether the second hash key and second predefined hash key match; and
   authenticating the input password and granting access to the target system based on determining successful matches both in the comparing in the first authentication system and the comparing in the second authentication system.

2. The method according to claim 1, wherein the first non-collision free hash algorithm unique to the first authentication system and the second non-collision free hash algorithm unique to second authentication system are collision-reliable hash algorithms.

3. The method according to claim 1, further comprising:
   creating the first predefined hash key by using the first non-collision free hash algorithm unique to the first authentication system, and creating the second predefined hash key by using the second non-collision free hash algorithm unique to the second authentication system;
   and storing the first predefined hash key in the first authentication system, and storing the second predefined hash key in the second authentication system.

4. The method according to claim 1, wherein the receiving comprises receiving the input password via a secure channel.

5. The method according to claim 1, wherein comparing the first hash key with a first predefined hash key and comparing the second hash key with a second predefined hash key comprise generating boolean information.

6. The method according to claim 1, wherein at least one of the receiving, the generating a first hash key, the concurrently generating a second hash key, the comparing in the first authentication system, the concurrently comparing in the second authentication system, and the authenticating and granting is performed by an operating system executing on a processor.

7. A secure logon system for a secure logon in a target system by using a first authentication system and a second authentication system, wherein a password is valid on the first authentication system and the second authentication system, the secure logon system comprising:
   a memory; and
   a processor in communications with the memory, wherein the computer system is configured to perform a method, the method comprising:
      receiving an input password at the first authentication system and at the second authentication system;
      based on the receiving, generating a first hash key based on the input password by using the first authentication system and concurrently generating a second hash key independent from the generating of the first hash key, based on the input password by using the second authentication system, wherein the first authentication system uses a first non-collision free hash algorithm unique to the first authentication system to generate the first hash key and the second authentication system uses a second non-collision free hash algorithm unique to the second authentication system to generate the second hash key; wherein the first non-collision free hash algorithm is different from the second non-collision free algorithm;
      creating a first predefined hash key by using the first non-collision free hash algorithm, and creating a second predefined hash key by using the second non-collision free hash algorithm;
      comparing in the first authentication system the first hash key with the first predefined hash key of the correct password stored in the first authentication system to determine whether the first hash key and first predefined hash key match and concurrently comparing in the second authentication system the second hash key with the second predefined hash key of the correct password stored in the second authentication system to determine whether the second hash key and second predefined hash key match; and
      authenticating the input password and granting access to the target system based on determining successful matches both in comparing in the first authentication system and the comparing in the second authentication system.

8. The secure logon system according to claim 7, wherein the target system and the first authentication system are part of one single system.

9. The secure logon system according to claim 7, wherein the secure logon system comprises the target system, the first authentication system and the second authentication system.

10. The secure logon system according to claim 7, wherein comparing the first hash key with a first predefined hash key and comparing the second hash key with a second predefined hash key comprise generating boolean information.

11. A computer program product for a cross system secure logon in a target system by using a first authentication system and a second authentication system, wherein a correct password is valid on the first authentication system and the second authentication system, the computer program product comprising:
  a non-transitory computer readable storage medium readable by a processing circuit and storing instructions for execution by the processing circuit for performing a method comprising:
    receiving an input password at the first authentication system and at the second authentication system;
    based on the receiving, generating a first hash key based on the input password by using the first authentication system and concurrently generating a second hash key independent from the generating of the first hash key, based on the input password by using the second authentication system, wherein the first authentication system uses a first non-collision free hash algorithm unique to the first authentication system to generate the first hash key and the second authentication system uses a second non-collision free hash algorithm unique to the second authentication system to generate the second hash key; wherein the first non-collision free hash algorithm is different from the second non-collision free algorithm;
    creating a first predefined hash key by using the first non-collision free hash algorithm, and creating a second predefined hash key by using the second non-collision free hash algorithm;
    comparing in the first authentication system the first hash key with the first predefined hash key of the correct password stored in the first authentication system to determine whether the first hash key and first predefined hash key match and concurrently comparing in the second authentication system the second hash key with the second predefined hash key of the correct password stored in the second authentication system to determine whether the second hash key and second predefined hash key match; and
    authenticating the input password and granting access to the target system based on determining successful matches both in the comparing in the first authentication system and the comparing in the second authentication system.

12. The computer program product according to claim 11, wherein the first non-collision free hash algorithm unique to the first authentication system and the second non-collision free hash algorithm unique to the second authentication system are collision-reliable hash algorithms.

13. The computer program product according to claim 11, wherein the method further comprises:
  creating the first predefined hash key by using the first non-collision free hash algorithm unique to the first authentication system, and creating the second predefined hash key by using the second non-collision free hash algorithm unique to the second authentication system; and
  storing the first predefined hash key in the first authentication system, and storing the second predefined hash key in the second authentication system.

14. The computer program product according to claim 11, wherein the receiving comprises receiving the input password via a secure channel.

15. The computer program product according to claim 11, wherein comparing the first hash key with a first predefined hash key and comparing the second hash key with a second predefined hash key comprise generating boolean information.

\* \* \* \* \*